United States Patent
Sahu

(10) Patent No.: US 11,631,903 B1
(45) Date of Patent: Apr. 18, 2023

(54) ZINC BROMINE ELECTROCHEMICAL CELL

(71) Applicant: Science Cadets, Inc., San Jose, CA (US)

(72) Inventor: Saroj Kumar Sahu, San Jose, CA (US)

(73) Assignee: Science Cadets, Inc., San Jose, CA (US)

( * ) Notice: Subject to any disclaimer, the term of this patent is extended or adjusted under 35 U.S.C. 154(b) by 0 days.

(21) Appl. No.: 18/082,054

(22) Filed: Dec. 15, 2022

(51) Int. Cl.
| | |
|---|---|
| *H01M 10/36* | (2010.01) |
| *H01M 10/42* | (2006.01) |
| *H01M 10/44* | (2006.01) |
| *H01M 4/66* | (2006.01) |
| *H01M 4/38* | (2006.01) |
| *H01M 4/36* | (2006.01) |
| *H01M 4/583* | (2010.01) |
| *H01M 4/60* | (2006.01) |
| *H01M 50/417* | (2021.01) |
| *H01M 50/491* | (2021.01) |
| *H01M 50/566* | (2021.01) |
| *H01M 50/562* | (2021.01) |
| *H01M 50/105* | (2021.01) |
| *H01M 50/178* | (2021.01) |
| *H01M 50/103* | (2021.01) |
| *H01M 50/107* | (2021.01) |
| *H01M 50/176* | (2021.01) |
| *H01M 12/08* | (2006.01) |
| *H01M 10/38* | (2006.01) |
| *H01M 4/02* | (2006.01) |

(52) U.S. Cl.
CPC ......... *H01M 10/365* (2013.01); *H01M 4/364* (2013.01); *H01M 4/38* (2013.01); *H01M 4/583* (2013.01); *H01M 4/602* (2013.01); *H01M 4/661* (2013.01); *H01M 10/38* (2013.01); *H01M 10/4235* (2013.01); *H01M 10/44* (2013.01); *H01M 12/085* (2013.01); *H01M 50/103* (2021.01); *H01M 50/105* (2021.01); *H01M 50/107* (2021.01); *H01M 50/176* (2021.01); *H01M 50/178* (2021.01); *H01M 50/417* (2021.01); *H01M 50/491* (2021.01); *H01M 50/562* (2021.01); *H01M 50/566* (2021.01); *H01M 2004/021* (2013.01); *H01M 2004/027* (2013.01); *H01M 2004/028* (2013.01); *H01M 2300/0002* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,162,351 | A * | 7/1979 | Putt | H01M 12/085 |
| | | | | 429/51 |
| 2019/0081346 | A1* | 3/2019 | Yun | H01M 10/4235 |
| 2022/0320514 | A1* | 10/2022 | Smith | H01M 4/62 |

* cited by examiner

*Primary Examiner* — Daniel S Gatewood
(74) *Attorney, Agent, or Firm* — Chen-Chi Lin

(57) ABSTRACT

A zinc bromine electrochemical cell comprises an anode-side subassembly, an insulating porous separator, and a cathode-side subassembly. The anode-side subassembly comprises an anode current terminal, an anode current collector, an anode support, an anode sheet, and an anode insulating net. The cathode-side subassembly comprises a cathode insulating mesh, a cathode graphite felt, a cathode sheet, a cathode current collector, and a cathode current terminal. The anode-side subassembly and the cathode-side subassembly are separated by the insulating porous separator.

23 Claims, 11 Drawing Sheets

ZINC BROMINE ELECTROCHEMICAL CELL

FIELD OF THE INVENTION

This invention relates generally to a zinc bromine electrochemical cell. More particularly, the present invention relates to a zinc bromine electrochemical cell that may be integrated, in parallel or in series, with other zinc bromine electrochemical cells to form a battery stack.

BACKGROUND OF THE INVENTION

High energy density rechargeable batteries that do not use lithium or cobalt are of great interest in the field of electrochemical energy storage. There is a scarcity of both lithium and cobalt. Cobalt is known for being mined under unethical conditions. There are several non-lithium and non-cobalt battery technologies being developed, such as sodium-prussian blue, nickel-hydride, nickel-hydrogen, nickel-cadmium, iron-chromium, all vanadium, all iron, zinc air, and zinc bromine.

Zinc-bromine technology has been explored by many companies over last 40 years as a flow battery. In a flow battery, the electrolytes are stored in tanks and pumped into the battery volume as required during charge and discharge operations. However, the ancillary systems such as the pumps, tanks, plumbing, and valves take up much volume and as a result the net system energy density of the battery becomes much less than what the basic battery can provide. Furthermore, the complexity of resultant flow system makes the product less reliable and prone to many maintenance calls. For example, while lithium batteries at a system level have a net energy density of 130-200 Watt-hour/kilogram, zinc bromine flow batteries, which have one of the best energy densities in the non-lithium battery space, have an energy density of 20-40 Watt-hour/kilogram at the system level.

Inherently, the zinc bromine chemistry can have a theoretical energy density of above 200 Watt-hour/kilogram. However, practical implementations needed to get to that degree of energy density create other problems, such as: (A) higher concentration of zinc bromide causing battery resistance to go up; (B) high amount of zinc plating resulting in uneven thickness of zinc on the anode and increases dendrite formation, and subsequently puncturing of the separator and shorting the battery. Such problems require solutions that limit the energy density to less than 40 Watt-hour/kilogram.

SUMMARY OF THE INVENTION

In examples of the present disclosure, a zinc bromine battery without any external flow is disclosed. Problems such as high resistance and zinc dendrites are addressed by a unique battery cell design.

A zinc bromine electrochemical cell comprises an anode-side subassembly, an insulating porous separator, and a cathode-side subassembly. The anode-side subassembly comprises an anode current terminal, an anode current collector, an anode support, an anode sheet, and an anode insulating net. The cathode-side subassembly comprises a cathode insulating mesh, a cathode graphite felt, a cathode sheet, a cathode current collector, and a cathode current terminal. The anode-side subassembly and the cathode-side subassembly are separated by the insulating porous separator.

DETAILED DESCRIPTION OF THE INVENTION

The electrolyte comprises an aqueous solution of zinc bromide in the concentration of 0.5 to 12 molar. Aqueous zinc bromide dissociates into ionic species:

$$ZnBr_2 \leftarrow\!\!\rightarrow Zn^{2+} + 2Br^- \tag{1}$$

When charging the cell, the anodic reaction is:

$$Zn^{2+} + 2e \rightarrow Zn \tag{2}$$

and the cathodic reaction is:

$$2Br^- \rightarrow 2e \tag{3}$$

When discharging the cell, the reactions in the opposite direction takes place. Open circuit voltage (OCV) for this pair of reactions is 1.85V.

Figure 1:
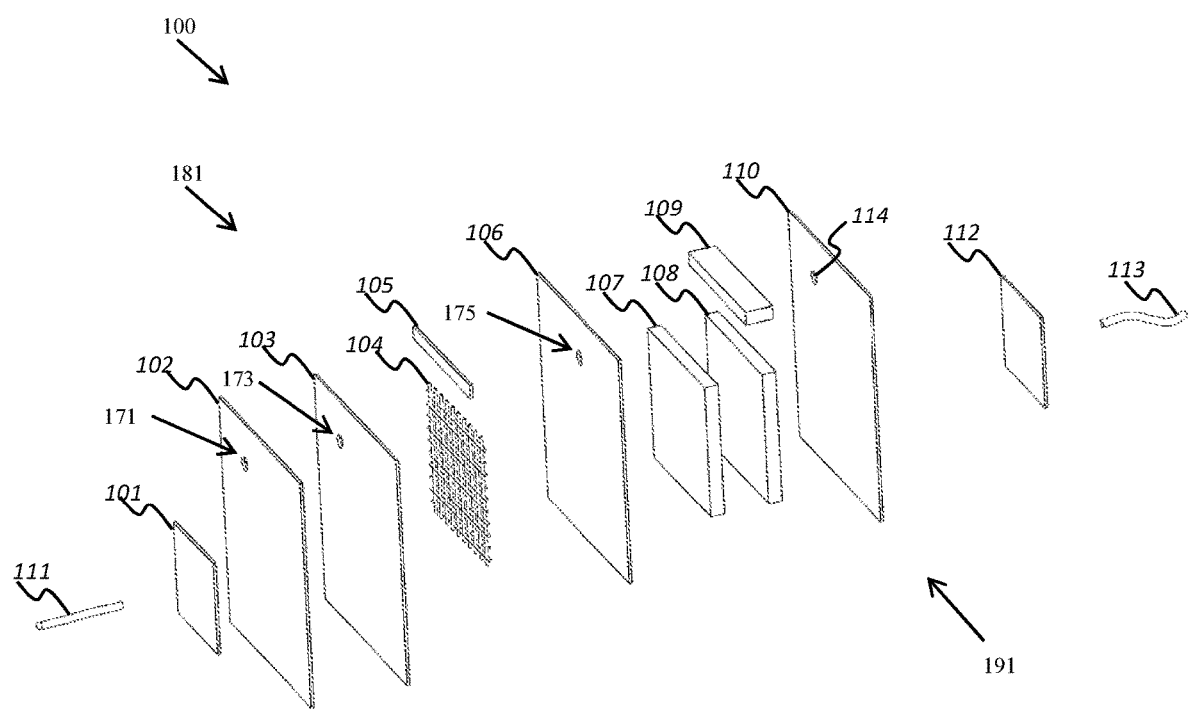
FIG. 1 is an exploded plot of a zinc bromine electrochemical cell in examples of the present disclosure.

FIG. 1 is an exploded plot of a zinc bromine electrochemical cell 100 in examples of the present disclosure. The zinc bromine electrochemical cell 100 comprises an anode-side subassembly 181, an insulating porous separator 106, and a cathode-side subassembly 191. The anode-side subassembly 181 comprises an anode current terminal 111, an anode current collector 101, an anode support 102, an anode sheet 103, and an anode insulating net 104 comprising a plurality of openings. The cathode-side subassembly 191 comprises a cathode insulating mesh 107, a cathode graphite felt 108, a cathode sheet 110, a cathode current collector 112, and a cathode current terminal 113. The anode-side subassembly 181 and the cathode-side subassembly 191 are separated by the insulating porous separator 106. In one example, each element of the zinc bromine electrochemical cell 100 is disposed by the order shown in FIG. 1.

In examples of the present disclosure, the anode current collector 101 comprises a sheet of copper, copper alloy, aluminum, or aluminum alloy. The anode sheet 103 comprises a zinc sheet and a titanium sheet. The zinc sheet faces the insulating porous separator 106.

In examples of the present disclosure, the anode sheet 103 comprises a zinc sheet and a carbon or graphite loaded conductive polymer composite sheet. The zinc sheet faces the insulating porous separator 106.

The anode insulating net 104 is between the anode sheet 103 and the insulating porous separator 106. A thickness of the insulating porous separator 106 is in a range from 0.1 mm and 2 mm. The insulating porous separator 106 comprises a polymer having an opening area to surface area ratio greater than 0.4.

In examples of the present disclosure, the cathode current collector 112 comprises a sheet of copper, copper alloy, aluminum, or aluminum alloy.

In examples of the present disclosure, the cathode sheet 110 comprises a zinc sheet and a titanium sheet. The zinc sheet faces the insulating porous separator 106.

In examples of the present disclosure, the cathode sheet 110 comprises a carbon or graphite loaded conductive polymer composite sheet.

In examples of the present disclosure, the cathode graphite felt 108 is between the cathode sheet 110 and the cathode insulating mesh 107. The cathode insulating mesh 107 contacts the insulating porous separator 106.

A thickness of the insulating porous separator 106 is in a range from 0.05 mm to 1.5 mm. A porosity of the insulating porous separator 106 is in a range from 20% to 75%. The insulating porous separator comprises a poly-olefin polymer.

An uncompressed porosity of the cathode graphite felt 108 is in a range from 70% to 95%. A compressed porosity of the cathode graphite felt 108 is in a range from 40% to 85%. A compressed thickness of the cathode graphite felt 108 is in a range from 0.5 mm to 10 mm. A graphite fiber diameter of the cathode graphite felt 108 is in a range from 0.0001 mm to 0.1 mm.

A porosity of the cathode insulating mesh 107 is in a range from 50% to 98%. A thickness of the cathode insulating mesh 107 is in a range from 0.05 mm to 1 mm. The cathode insulating mesh comprises Polytetrafluoroethylene (PTFE), poly-ethylene or poly-propylene.

In examples of the present disclosure, the zinc bromine electrochemical cell 100 further comprises an aqueous electrolyte solution for bromine sequestration and zinc dendrite suppression. The aqueous electrolyte solution comprising zinc bromide and additives.

A plurality of zinc ions are electroplated onto a surface of the anode sheet 103 as zinc metal during a charging process. A portion of the zinc metal is de-plated into another plurality of zinc ions during a discharging process. A plurality of bromine ions are converted to elemental bromine during the charging process. A portion of the elemental bromine is converted to another plurality of bromine ions during the discharging process.

A molarity of the zinc bromide of the aqueous electrolyte solution is in a range from 1.5 to 12.

The additives of the aqueous electrolyte solution comprises poly-ethylene glycol having a weight percent in a range from 0.5% to 10% and polysorbate having a weight percent in a range from 0.05% to 5%.

The additives of the aqueous electrolyte solution comprises tetra propyl ammonium bromide (TPABr) and methyl ethyl pyrrolidinium bromide (MEPBr).

A weight fraction of the TPABr is in a range from 0.01% to 400%; and wherein a mixture of the TPABr and the zinc bromide is heterogeneous.

A weight fraction of the MEPBr is in a range from 0.01% and 400%; and wherein a mixture of MEPBr and the zinc bromide is heterogeneous.

Figure 2:
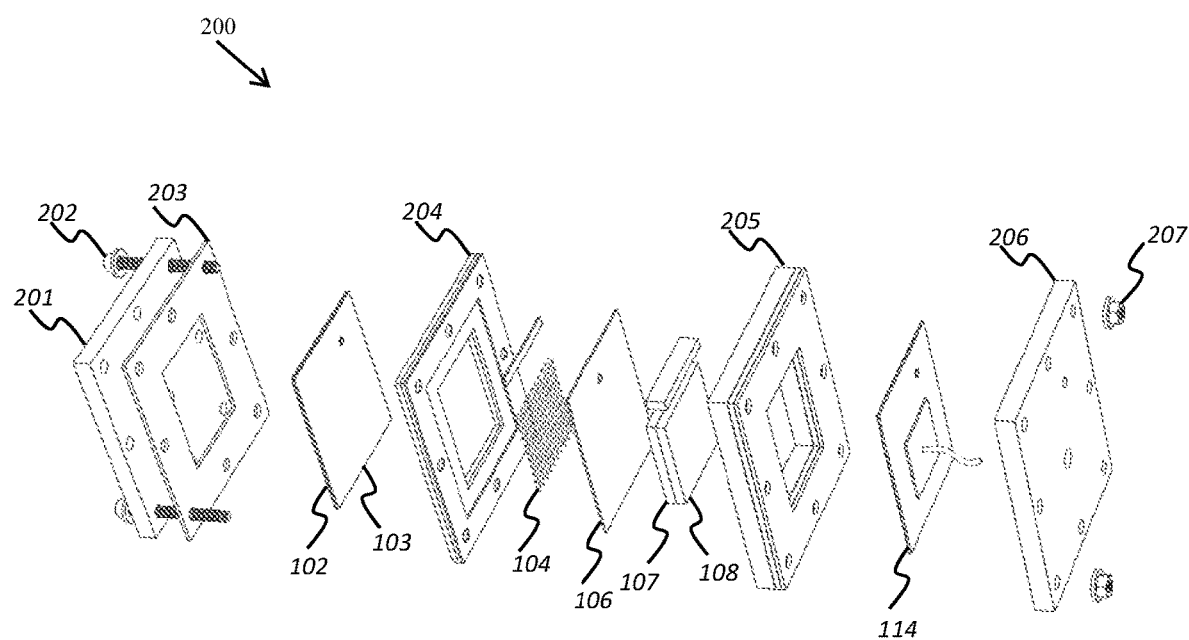
FIG. 2 is an exploded plot of a zinc bromine electrochemical cell package in examples of the present disclosure.
Figure 3:
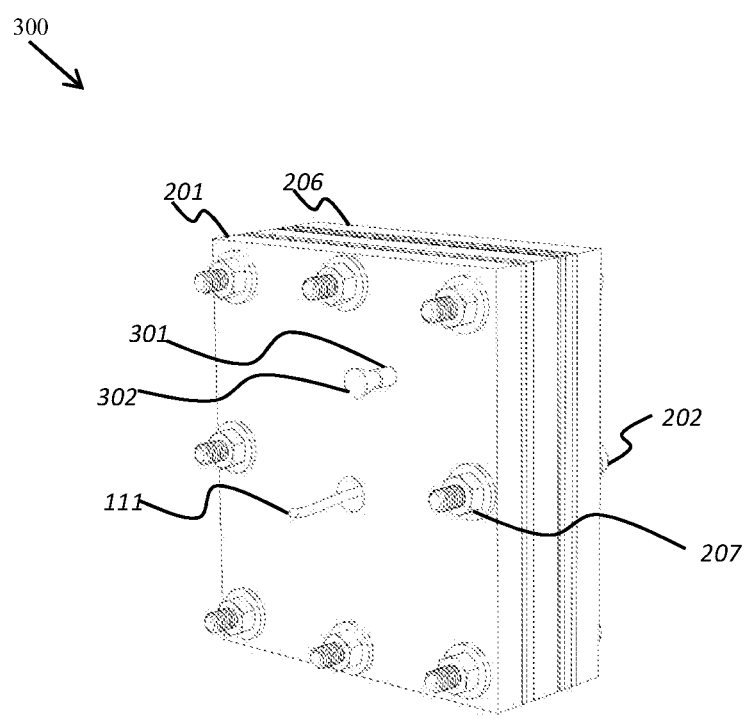
FIG. 3 shows an isotropic view of a cell package in examples of the present disclosure.

FIG. 2 is an exploded plot of a zinc bromine electrochemical cell package 200 in examples of the present disclosure. FIG. 3 shows an isotropic view of a cell package 300 in examples of the present disclosure. In one example, the zinc bromine electrochemical cell package 200 of FIG. 2 is the cell package 300 in an exploded plot condition. In examples of the present disclosure, the zinc bromine electrochemical cell 100 is gasketed, framed and packaged so as to hold the aqueous electrolyte solution from leaking. A portion of the anode current collector 101 and a portion of the cathode current collector 112 are exposed for external electrical connections.

Figure 9:
FIG. 9 is an exploded plot of a portion of a zinc bromine electrochemical cell including a first copper wire, an anode current collector, a cathode current collector, and a second copper wire in examples of the present disclosure.

A first copper wire 911 of FIG. 9 is welded to the exposed portion of the anode current collector 101. A second copper wire 913 of FIG. 9 is welded to the exposed portion of the cathode current collector 112.

After the cell package 300 is fully assembly, electrolyte is added to the cell volume by injecting it through the port hole 114 on cathode sheet 110 of FIG. 1. Similar port holes 171, 173, and 175 may be present in anode support 102, anode sheet 103, and the insulating porous separator 106 respectively, so that the electrolyte is filled adequately in the entire internal volume of the cell package 300. Optionally, the cathode graphite felt 108 and the cathode insulating mesh 107 are over-saturated with the electrolyte before the assembly of the cell package 300, so that as the cell package 300 is fastened, the cathode graphite felt 108 and the cathode insulating mesh 107 are compressed so that the extra electrolyte is squeezed out of the cathode graphite felt 108 and the cathode insulating mesh 107, filling the rest of the voids in the cell package 300, including the pores in the insulating porous separator 106 and openings in the anode insulating net 104.

In examples of the present disclosure, the electrolyte has a few additives for different purposes. The additives are for reducing zinc dendrite formation and promoting uniform zinc electroplating during charging include Poly-Ethylene Glycol (PEG) in weight percent between 0.5% and 10% and Polysorbate in weight percent between 0.05% and 5% with respect to water. Both these additives are obtainable from Sigma-Aldrich, Inc.

When aqueous bromine is generated at the cathode during charging, a large part of it must be sequestered in a complex.

For solid-phase sequestration, tetra propyl ammonium bromide (TPABr) is added to the electrolyte in the weight percent of 0% to 400% with respect to water. Since solubility of TPABr is far lower than that of zinc bromide, at high concentrations of zinc bromide, such as above 1 Molar, most of the TPABr crashes out of the solution and being of lower density than the solution, floats to the top of the solution volume, both on anode and cathode sides, as anode sequestration volumes (ASV) 105 and cathode sequestration volumes (CSV) 109, respectively. As elemental bromine is generated on the cathode, part of that is absorbed reversibly by the CSV 109 by virtue of the combination and de-combination reaction:

$$\text{TPABr} + \text{Br}_2 \underset{[TPA]^+[Br_3]^-}{\longleftrightarrow} \qquad (4)$$

The CSV 109 now comprises part $[TPA]^+[Br_3]^-$ and part TPABr. Sequestering the elemental bromine in this type of complex helps towards the safety of the battery system, as in the case of a damage to the battery and electrolyte leaking out, the toxic and foul-smelling bromine does not get exposed. Besides, the more bromine is sequestered, the less of that is available in the main electrolyte volume, and therefore less diffuses to the anode side of the insulating porous separator 106 to the anode side. That helps in reducing the self-discharge of the cell, thus greatly increasing the coulombic efficiency of the cell package 300.

The volume of ASV 105 comprises mostly TPABr. Since there is very little bromine on the anode side, almost no TPABr-bromine complexation happens in this volume. Therefore, ASV 105 is an unnecessary but unavoidable component of the cell package 300.

For liquid-phase sequestration, methyl ethyl pyrrolidinium bromide (MEPBr) is added to the electrolyte in the weight percent of 0% to 400% with respect to water. As elemental bromine is generated in the cathode, part of that is absorbed reversibly by MEPBr by virtue of the combination and de-combination reaction:

$$MEPBr+Br_2 \leftarrow \rightarrow [MEP]+[Br_3]- \quad (5)$$

[MEP]+[Br_3]– is a complex that is in liquid phase and is uniformly distributed in the electrolyte volume. Sequestering the elemental bromine in this type of complex helps towards the safety of the battery system, as in the case of a damage to the battery and electrolyte leaking out, the toxic and foul-smelling bromine does not get exposed. Besides, the more bromine is sequestered, the less of that is available in the main electrolyte volume, and therefore less diffuses to the anode side of the insulating porous separator 106 to the anode side. That helps in reducing the self-discharge of the cell package 300, thus greatly increasing the coulombic efficiency of the cell package 300.

The rate constant combination or de-combination of the MEPBr/Br2 sequestration reaction is much faster than that of the TPABr/Br2 sequestration reaction. Therefore, if the system is designed to be able to deliver a lot of power per unit volume of cell, more of MEPBr is used as opposed to TPABr. On the other hand, when preservation of energy is required by reducing the self-discharge, more of TPABr is used as opposed to MEPBr. Both, TPABr and MEPBr may be purchased from Sigma-Aldrich, Inc.

During the charging operation, metallic zinc is plated out of the zinc bromide solution on to the anode sheet 103 on the side facing the insulating porous separator 106. The anode sheet 103 is typically made out of a zinc sheet of thickness 0.05 mm to 2 mm. In this implementation, the anode sheet 103 comprises the zinc sheet from part No. 1007T811 of McMaster-Carr Supply Company, with the thickness of 0.5 mm. Electro-deposition of zinc is much favored on a native zinc surface as opposed to a non-zinc conducting surface. As the deposition continues, a layer of plated zinc grows on the surface of the anode sheet 103. The anode insulating net 104 placed between the anode sheet 103 and insulating porous separator 106 facilitates growing the plating thickness without touching the insulating porous separator 106. In that way, the zinc metal does not touch the insulating porous separator 106 and therefore does not have the opportunity to penetrate the insulating porous separator 106, which would otherwise potentially electrically short the anode and cathode of the cell package 300.

In one example, the anode insulating net 104 is a polyethylene net, a part No. 9314T26 from McMaster-Carr Supply Company, which has a thickness 0.6 mm and opening area of 60%. In examples of the present disclosure, the anode insulating net 104 comprises a polymer with opening area to surface area ratio greater than 0.4, and a thickness between 0.1 mm and 2 mm, with an opening area of at least 20%. As an alternative implementation, the surface of the insulating porous separator 106 facing the anode sheet 103 can be manufactured with ribs so that a net is naturally provided. For instance, the insulating porous separator 106 can be manufactured with a set of ribs of height between 0.1 mm and 0.4 mm, with a base width between 0.5 mm and 2 mm, and with a pitch between 2 mm and 15 mm.

The anode current terminal 111 and the anode current collector 101 are soldered or welded together, and both are made out of a highly conductive metal. In one example, the anode current terminal 111 and the anode current collector 101 are made of copper. Thickness of the anode current terminal 111 depends on the magnitude of the current transacted in the cell, so that the resistive heat generated and voltage loss incurred are within the safety and performance budget of the system. Thickness of the anode current collector 101 depends on the magnitude of the current transacted and areal current density of the cell, so that the voltage distribution is within the safety and performance budget of the system.

During charging, on the cathode side, bromide ion is reduced to elemental aqueous bromine. Most of the reaction happens in the volume of the conductive, cathode graphite felt 108. Part of the bromine is complexed with TPABr in the volume of CSV 109, and part of the bromine is complexed with MEPBr and stays within the cathode volume.

The electrical connections and the flow of charge takes place during the charging as follows: The anode current terminal 111 and cathode current terminal 113 are presented with a negative and positive electrical potential, respectively. Charging effectively starts when the potential difference is greater than 1.85V. Different types of charging algorithms may be used. In examples of the present disclosure, constant current constant voltage fixed time (CC-CV-FT) charging algorithm is used. The voltage is closed-loop adjusted so that a constant current of C/5, where C represents the coulombic capacity of the cell package 300, flowed into the cell package 300 as charging current for 5 hours, subject to the maximum cell voltage being 2.0V, upon which the current would be tapered down to maintain the constant current.

When most of the zinc and bromine are electro-deposited out of the electrolyte volume, resistance of the cell package 300 increases and so does the cell voltage at a given current.

The cathode current terminal 113 and the cathode current collector 112 are soldered or welded together. The cathode current terminal 113 and the cathode current collector 112 are made of a highly conductive metal. In examples of the present disclosure, the cathode current terminal 113 and the cathode current collector 112 are made of copper. Thickness of the cathode current terminal 113 depends on the magnitude of the current transacted in the cell package 300, so that the resistive heat generated and voltage loss incurred are within the safety and performance budget of the system. Thickness of the cathode current collector 112 depends on the magnitude of the current transacted and areal current density of the cell package 300, so that the voltage distribution is within the safety and performance budget of the system.

The cathode sheet 110 is a sheet made of a conductive material resistant to bromine. In one example, the cathode sheet 110 is a sheet of titanium, with thickness of 0.15 mm, with part No. 9051K48 from McMaster-Carr Supply Company. In another example, cathode sheet 110 is conductive but is a non-metallic sheet such as a graphite loaded plastic sheet. However, the surface area of a titanium or conductive plastic surface is not sufficient for bromide-bromine reaction to proceed in a fast way. Therefore, the cathode graphite felt 108 is introduced as a surface area enhancer for the cathode sheet 110.

The cathode graphite felt 108 is manufactured from an unwoven polymeric fabric of rayon, cellulose, or polyacrylonitrile (PAN) by heating it in vacuum or in absence of oxygen at refractory temperatures, typically above 2,000 degrees C., thus turning the polymeric fabric into a graphite felt. The cathode graphite felt 108 may subsequently be activated by chemically or electrochemically etching the surface of the graphite fibers in the felt to increase the effective surface area. In one example, the cathode graphite felt 108 comprises of part No. G600 of the Avcarb LLC with an uncompressed thickness of 6 mm, with a porosity of 90%, and with a fiber thickness of 50 micron. However, in other applications and implementations, the cathode graphite felt 108 may have a thickness between 0.5 mm and 10 mm, with an uncompressed porosity between 50% and 97%, with a fiber diameter between 5 micron and 200 microns.

The cathode insulating mesh 107 prevents the cathode graphite felt 108 from directly touching the insulating porous separator 106. In case of the cathode graphite felt 108 and the insulating porous separator 106 touching each other, loose fibers from the cathode graphite felt 108 can dislodge and penetrate into the pores of the insulating porous separator 106 and reach the anode, thus creating an electrical short. In examples of the present disclosure, a fiberglass filter paper disc with part No. 6737T44 from McMaster-Carr Supply Company of thickness 0.3 mm is used for the cathode insulating mesh 107.

In examples of the present disclosure, the insulating porous separator 106 is placed between the anode insulating net 104 and the cathode insulating mesh 107, essentially dividing the anode and cathode sides of the cell package 300. The insulating porous separator 106 is typically a micro- or nano-porous separator with thickness between 20 micron and 2 mm, porosity between 20% and 90%, and is made of a poly-olefin material, such as polyethylene or polypropylene. In examples of the present disclosure, a commercial porous separator part No. 3401 from Celgard, LLC was used. The insulating porous separator 106 prevents a direct short between the anode and cathode sides. It is also chosen with sufficient tortuosity such that the free diffusion of ions between the anode and cathode sides are discouraged, which otherwise would result in large self-discharge of the cell.

During the discharging of the cell, the plated metallic zinc on the anode sheet 103 electrochemically oxidizes into zinc ion and dissolves back into the electrolyte volume. At the same time, at cathode sheet 110 and cathode graphite felt 108, bromine de-combines from the complexing agents and is reduced to bromide ions and dissolves into the electrolyte volume.

Mechanical sealing structures are not shown in FIG. 1. Mechanical sealing structures are shown in FIG. 2. All the components shown in FIG. 1 are incorporated in FIG. 2.

In FIG. 2, end plates 201 and 206 are made of an electrical insulator such as a plastic and are designed to compress the cell assembly and gaskets so that the cell is sealed without any leaks. Spacers and gaskets 203, 204, and 205 are used as required as per common mechanical design practices to compress and seal the cell. Fasteners 202 and 207 keep the cell compressed and sealed. The gaskets are made of elastomers resistant to aqueous bromine, such as EPDM and FKPM. The fasteners 202 and 207 are tightened so that the cathode graphite felt 108 is compressed by 10% to 70% for optimal conductivity, and gaskets are compressed between 4% and 30% for optimal sealing. Though only two sets of fasteners are shown, the number of sets of fasteners may vary.

A completely built cell package 300 is shown in FIG. 3. All the parts in FIG. 1 and FIG. 2 are incorporated in FIG. 3. The anode current terminal 111, the fasteners 202 and 207, and the end plates 201 and 206 are re-annotated for clarity. The port 301 is a non-conducting tube that is used to fill the electrolyte into the cell after it has been assembled. After the cell package 300 is filled with electrolyte, the port 301 is sealed with a stopper 302 so that the electrolyte does not lose any water due to evaporation.

Several zinc bromine electrochemical cell 100 may be assembled in an N-Series combination into a stack so that the voltage of the stack is N times the voltage of the cell. Components are assembly of such an N-Series stack are described in FIGS. 4, 5, 6, and 7.

Figure 4:
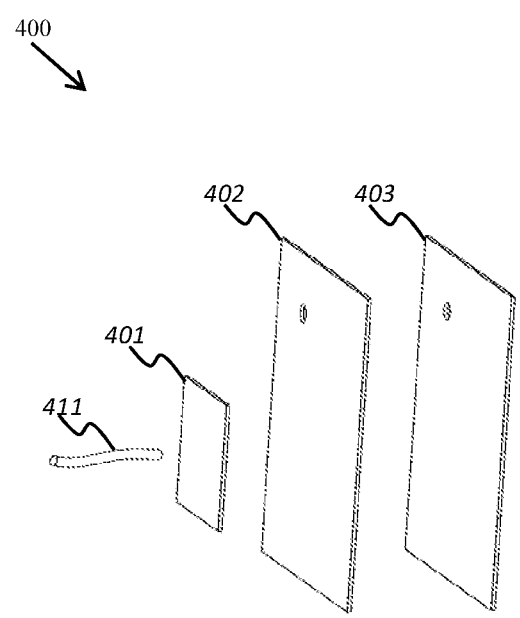
FIG. 4 is an exploded plot of a portion of an anode-side subassembly in examples of the present disclosure.
Figure 8:
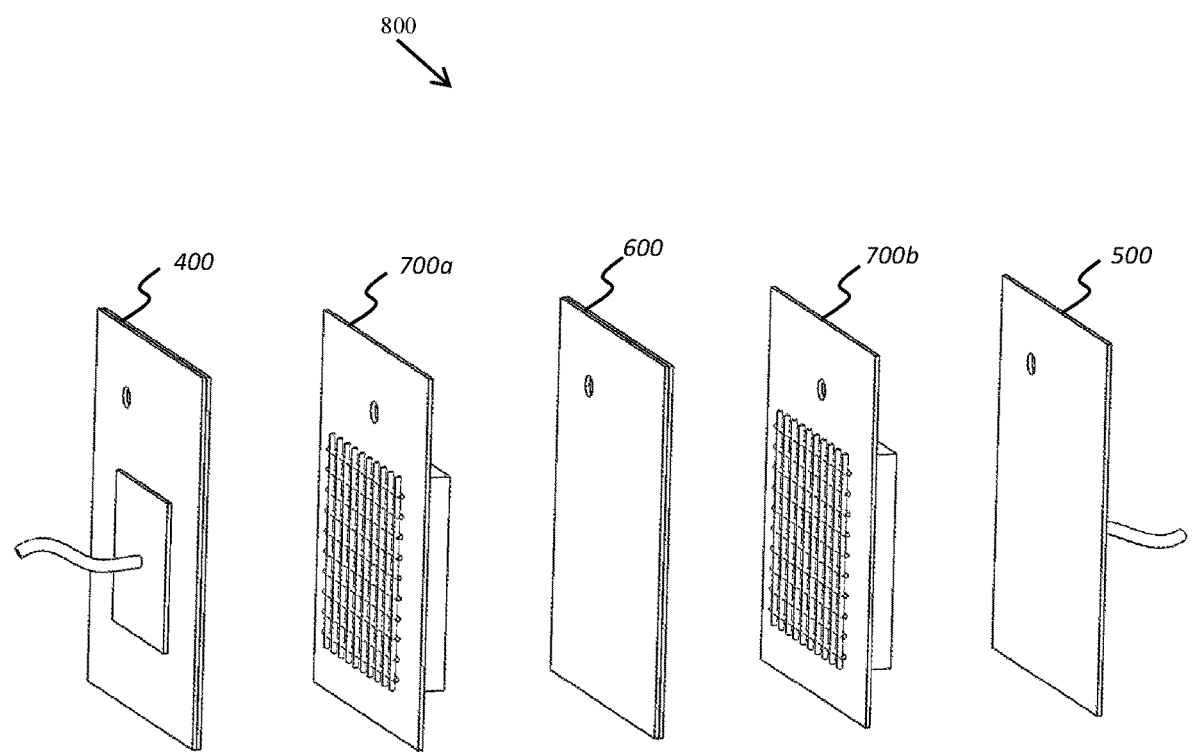
FIG. 8 is an exploded plot of a battery stack in examples of the present disclosure.

FIG. 4 is an exploded plot of a portion 400 of an anode-side subassembly 181 in examples of the present disclosure. The portion 400 of the anode-side subassembly 181 may be used in the 2-Series battery stack 800, where N=2, is illustrated in FIG. 8. The portion 400 of the anode-side subassembly 181 comprises an anode current terminal 411, an anode current collector 401, an anode support 402, and an anode sheet 403. The anode current terminal 411 and the anode current collector 401 are soldered or welded together, and both are made of a highly conductive metal. In examples of the present disclosure, anode current terminal 411 and the anode current collector 401 are made of copper. Thickness of the anode current terminal 411 depends on the magnitude of the current transacted in the stack, so that the resistive heat generated and voltage loss incurred are within the safety and performance budget of the system. Thickness of the anode current collector 401 depends on the magnitude of the current transacted and areal current density of the stack, so that the voltage distribution is within the safety and performance budget of the system. During charging of the stack, metallic zinc is plated on the surface of the anode sheet 403 away from the anode support 402. The anode sheet 403 is typically made of a zinc sheet of thickness 0.05 mm to 2 mm. In examples of the present disclosure, the anode sheet 103 comprises the zinc sheet from McMaster-Carr Supply Company part No. 1007T811, with a thickness of 0.5 mm.

Figure 5:
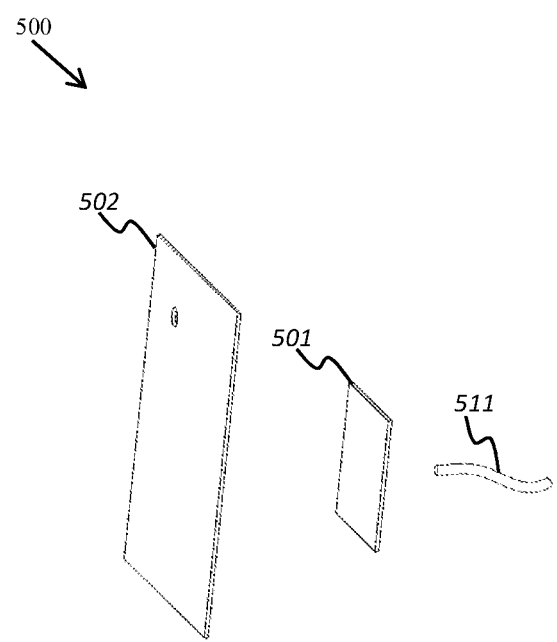
FIG. 5 is an exploded plot of a portion of a cathode-side subassembly in examples of the present disclosure.

FIG. 5 is an exploded plot of a portion 500 of a cathode-side subassembly 191 in examples of the present disclosure. The portion 500 of the cathode-side subassembly 191 may be used in the 2-Series battery stack 800 illustrated in FIG. 8. The portion 500 of the cathode-side subassembly 191 comprises a cathode current terminal 511, a cathode current collector 501, and a cathode sheet 502. The cathode current terminal 511 and the cathode current collector 501 are soldered or welded together. The cathode current terminal 511 and the cathode current collector 501 are made of a highly conductive metal. In one example, the cathode current terminal 511 and the cathode current collector 501 are made out of copper. Thickness of the cathode current terminal 511 depends on the magnitude of the current transacted in the stack, so that the resistive heat generated and voltage loss incurred are within the safety and performance budget of the system. Thickness of the cathode current collector 501 depends on the magnitude of the current transacted and areal current density of the stack, so that the voltage distribution is within the safety and performance budget of the system. Cathode sheet 502 is a sheet made of a conductive material resistant to bromine. In one example, cathode sheet 502 is a sheet of titanium, with thickness of 0.15 mm, with part No. 9051K48 from McMaster-Carr Supply Company. In another example, cathode sheet 502 is conductive, but is made of a non-metallic sheet such as a graphite loaded plastic sheet.

Figure 6:
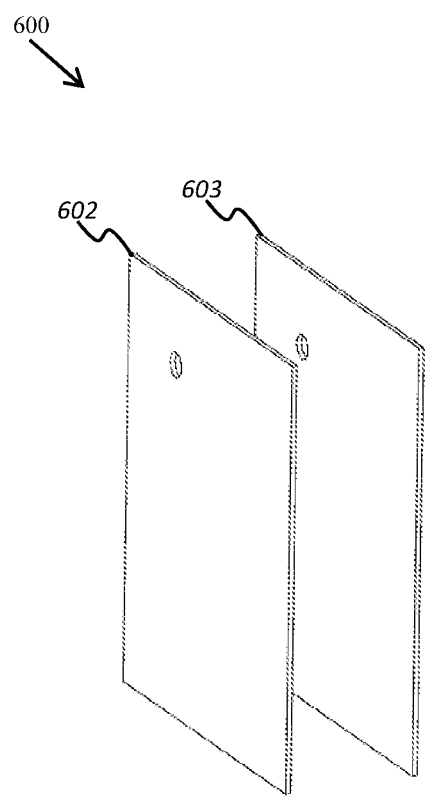
FIG. 6 is an exploded plot of a bipolar plate subassembly in examples of the present disclosure.

FIG. 6 is an exploded plot of a bipolar plate subassembly 600 in examples of the present disclosure. The bipolar plate subassembly 600 may be used in the 2-Series battery stack 800 of FIG. 8. The bipolar plate subassembly 600 comprises a cathode plate 602 and an anode plate 603 joined together by physical touch, metal rolling or another metal-joining process. In a multi-series assembly of the battery stack, bipolar plate subassembly 600 serves as the positive plate of one cell (cathode plate 602) and negative plate of the adjacent cell (anode plate 603). In examples of the present disclosure, the anode plate 603 comprises the zinc sheet from McMaster-Carr Supply Company part No. 1007T811, with the thickness of 0.5 mm. In examples of the present disclosure, the cathode plate 602 is a sheet of titanium, with thickness of 0.15 mm, with part No. 9051K48 from McMaster-Carr Supply Company. In examples of the present disclosure, cathode plate 602 is conductive, but is made of a non-metallic sheet such as a graphite loaded plastic sheet.

Figure 7:
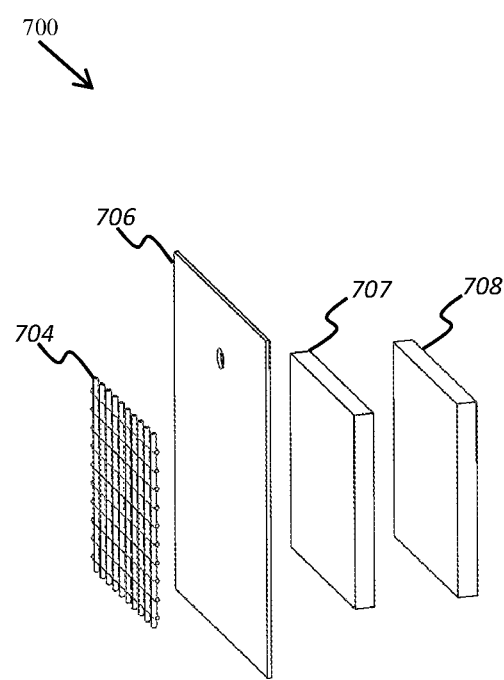
FIG. 7 is an exploded plot of a membrane electrode assembly in examples of the present disclosure.

FIG. 7 is an exploded plot of a membrane electrode assembly (MEA) 700 in examples of the present disclosure. The MEA 700 may be used in the 2-Series battery stack 800 illustrated in FIG. 8. The MEA 700 comprises an anode insulating net 704 (similar to the anode insulating net 104 of FIG. 1), an insulating porous separator 706 (similar to the insulating porous separator 106 of FIG. 1), a cathode insulating mesh 707 (similar to the cathode insulating mesh 107 of FIG. 1), and a cathode graphite felt 708 (similar to the cathode graphite felt 108 of FIG. 1). These four elements are in close physical touch with one another in the sequence shown in FIG. 7, aided by adequate application of frames, gaskets and fasteners, as exemplified in FIG. 2 and FIG. 3. In an N-Series assembly of a battery stack, the anode insulating net 704 side of the MEA 700 touches the portion 400 of the anode-side subassembly 181 or the anode plate 603 of the bipolar plate subassembly 600. In an N-Series assembly of a battery stack, the cathode graphite felt 708 of the MEA 700 touches the portion 500 of the cathode-side subassembly 191 or the cathode plate 602 of the bipolar plate subassembly 600.

FIG. 8 is an exploded plot of a battery stack 800 in examples of the present disclosure. A 2-Series battery stack 800 of active components may be assembled. The bipolar plate subassembly 600 is flanked by two MEAs 700a and 700b. This combination is then flanked by the portion 400 of the anode-side subassembly 181 and the portion 500 of the cathode-side subassembly 191. The cathode plate 602 of the bipolar plate subassembly 600 is in contact with the graphite felt 708 of the MEA 700a. The anode plate 603 of the bipolar plate subassembly 600 is in contact with the anode insulating net 704 of the MEA 700b. The anode net of the MEA 700a is in contact with the anode sheet 403 of the portion 400 of the anode-side subassembly 181. The graphite felt 708 of the MEA 700b is in contact with the cathode sheet 502 of the portion 500 of the cathode-side subassembly 191.

In the usual operation of the cell, the nominal voltages on the portion 400 of the anode-side subassembly 181 is 0 V, on the bipolar plate subassembly 600 is 1.85 V, and on the portion 500 of the cathode-side subassembly 191 is 3.7V. During charging, as anodic reaction, metallic zinc is plated on the anode sheet 403 of the portion 400 of the anode-side subassembly 181 and anode plate 603 of bipolar plate subassembly 600. During charging, as cathodic reaction, bromine is generated from bromide ions in the graphite felt volumes of MEAs 700a and 700b.

The design of the 2-Series stack may be extended to N-Series (with N cells in series, where N is an integer larger than 2).

For 2-Series the sequence is the portion 400 of the anode-side subassembly 181-MEA 700a-bipolar plate subassembly 600—MEA 700b—the portion 500 of the cathode-side subassembly 191.

For 3-Series the sequence is the portion 400 of the anode-side subassembly 181-MEA 700a-bipolar plate subassembly 600a—MEA 700b—bipolar plate subassembly 600b—MEA 700c-the portion 500 of the cathode-side subassembly 191.

As a general rule, an N-Series stack consists of one of the portion 400 of the anode-side subassembly 181, one of the portion 500 of the cathode-side subassembly 191, (N−1) bipolar plates subassembly 600 and N MEAs 700.

In the practical design of the battery stack 800, concepts of frames, gaskets, fasteners, fill ports, CSV and ASV developed in the description of FIGS. 1, 2, and 3 are incorporated.

Figure 10:
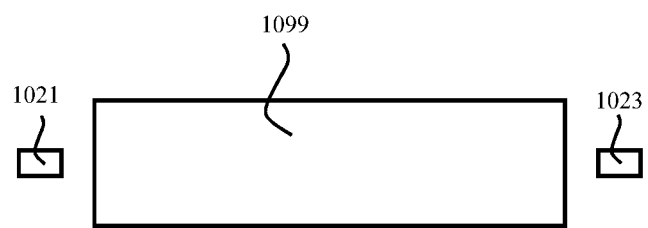
FIG. 10 is an exploded plot of a sealed pouch or case, a first conductive tab, and a second conductive tab in examples of the present disclosure.

In one example, the zinc bromine electrochemical cell 100 is packaged inside a sealed pouch or case 1099 of FIG. 10. A first conductive tab 1021 of FIG. 10 and a second conductive tab 1023 of FIG. 10 protrude out of the pouch or case for external electrical connections. The first conductive tab is connected to the anode current collector 101. The second conductive tab is connected to the cathode current collector 112.

Figure 11:
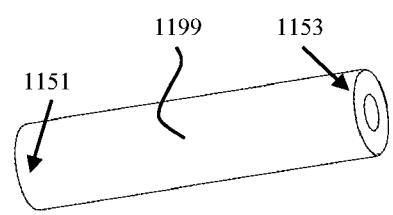
FIG. 11 is an exploded plot of a sealed pouch or case, a first conductive tab, and a second conductive tab in examples of the present disclosure.

In examples of the present disclosure, the zinc bromine electrochemical cell 100 is of a rectangular prism shape having a length to width ratio greater than 3. The zinc bromine electrochemical cell 100 is packaged in a sealed cylindrical can 1199 of FIG. 11. The anode current collector 101 is welded to a first side 1151 of FIG. 11 of the sealed cylindrical can 1199 of FIG. 11. The cathode current collector 112 is welded to a second side 1153 of FIG. 11 of the sealed cylindrical can 1199 of FIG. 11. The first side of the sealed cylindrical can is electrically insulated from the second side of the sealed cylindrical can.

In examples of the present disclosure, a sealed single package comprises the zinc bromine electrochemical cell 100 and a plurality of additional electrochemical cells. The electrochemical cell and each of the plurality of additional electrochemical cells are in parallel connection. The anode current collector 101 is electrically connected to each anode current collector of the plurality of additional electrochemical cells. The cathode current collector 112 is electrically connected to each cathode current collector of the plurality of additional electrochemical cells.

In examples of the present disclosure, the zinc bromine electrochemical cell 100 further comprises a plurality of additional intermediate groups. Each of the plurality of additional intermediate groups comprises, in the order presented, an additional cathode insulating mesh (similar to cathode insulating mesh 107 of FIG. 1), an additional cathode graphite felt (similar to cathode graphite felt 108 of FIG. 1), an additional cathode sheet (similar to cathode sheet 110 of FIG. 1), an additional cathode current collector (similar to cathode current collector 112 of FIG. 1), a first separator (similar to insulating porous separator 106 of FIG. 1), an additional anode current collector (similar to anode current collector 101 of FIG. 1), an additional anode sheet (similar to anode sheet 103 of FIG. 1), an additional anode insulating net (similar to anode insulating net 104 of FIG. 1), and a second separator (similar to insulating porous separator 106 of FIG. 1). The plurality of additional intermediate groups are between the insulating porous separator 106 and the cathode-side subassembly 191. Each of the plurality of additional intermediate groups is in series connection.

Those of ordinary skill in the art may recognize that modifications of the embodiments disclosed herein are possible. For example, a total number of zinc bromine electrochemical cells in a stack may vary. Other modifications may occur to those of ordinary skill in this art, and all such modifications are deemed to fall within the purview of the present invention, as defined by the claims.

The invention claimed is:

1. An electrochemical cell comprising:
   an anode-side subassembly comprising:
   an anode current collector;
   an anode sheet; and
   an anode insulating net comprising:
   a plurality of openings;
   an insulating porous separator;
   a cathode-side subassembly comprising:
   a cathode insulating mesh;
   a cathode graphite felt;
   a cathode sheet; and
   a cathode current collector; and
   an aqueous electrolyte solution for bromine sequestration and zinc dendrite suppression, the aqueous electrolyte solution comprising:
   zinc bromide; and
   additives;
   wherein a plurality of zinc ions are electroplated onto a surface of the anode sheet as zinc metal during a charging process;
   wherein a portion of the zinc metal is de-plated into another plurality of zinc ions during a discharging process;
   wherein a plurality of bromine ions are converted to elemental bromine during the charging process;
   wherein a portion of the elemental bromine is converted to another plurality of bromine ions during the discharging process;
   wherein the anode-side subassembly and the cathode-side subassembly are separated by the insulating porous separator; and
   wherein the electrochemical cell is filled with the aqueous electrolyte solution.

2. The electrochemical cell of claim 1, wherein the anode current collector comprises a sheet of copper, copper alloy, aluminum, or aluminum alloy.

3. The electrochemical cell of claim 1, wherein the anode sheet comprises a zinc sheet and a titanium sheet; and wherein the zinc sheet faces the insulating porous separator.

4. The electrochemical cell of claim 1, wherein the anode insulating net is between the anode sheet and the insulating porous separator; wherein a thickness of the insulating porous separator is in a range from 0.1 mm and 2 mm; and wherein the insulating porous separator comprises a polymer having an opening area to surface area ratio greater than 0.4.

5. The electrochemical cell of claim 1, wherein the cathode current collector comprises a sheet of copper, copper alloy, aluminum, or aluminum alloy.

6. The electrochemical cell of claim 1, wherein the cathode sheet comprises a zinc sheet and a titanium sheet; and wherein the zinc sheet faces the insulating porous separator.

7. The electrochemical cell of claim 1, wherein the cathode graphite felt is between the cathode sheet and the cathode insulating mesh; and wherein the cathode insulating mesh contacts the insulating porous separator.

8. The electrochemical cell of claim 1, wherein a thickness of the insulating porous separator is in a range from 0.05 mm to 1.5 mm; and wherein a porosity of the insulating porous separator is in a range from 20% to 75%.

9. The electrochemical cell of claim 1, wherein the insulating porous separator comprises a poly-olefin polymer.

10. The electrochemical cell of claim 1, wherein an uncompressed porosity of the cathode graphite felt is in a range from 70% to 95%; wherein a compressed porosity of the cathode graphite felt is in a range from 40% to 85%, wherein a compressed thickness of the cathode graphite felt is in a range from 0.5 mm to 10 mm; and wherein a graphite fiber diameter of the cathode graphite felt is in a range from 0.0001 mm to 0.1 mm.

11. The electrochemical cell of claim 1, wherein a porosity of the cathode insulating mesh is in a range from 50% to 98%; and wherein a thickness of the cathode insulating mesh is in a range from 0.05 mm to 1 mm.

12. The electrochemical cell of claim 1, wherein the cathode insulating mesh comprises polytetrafluoroethylene (PTFE), poly-ethylene or poly-propylene.

13. The electrochemical cell of claim 1, wherein a molarity of the zinc bromide of the aqueous electrolyte solution is in a range from 1.5 M to 12 M.

14. The electrochemical cell of claim 13, wherein the additives of the aqueous electrolyte solution comprises poly-ethylene glycol having a weight percent in a range from 0.5% to 10% and polysorbate having a weight percent in a range from 0.05% to 5%.

15. The electrochemical cell of claim 13, wherein the additives of the aqueous electrolyte solution comprises tetra propyl ammonium bromide (TPABr) and methyl ethyl pyrrolidinium bromide (MEPBr).

16. The electrochemical cell of claim 15, wherein a weight fraction of the TPABr is in a range from 0.01% to 400%; and wherein a mixture of the TPABr and the zinc bromide is heterogeneous.

17. The electrochemical cell of claim 15, wherein a weight fraction of the MEPBr is in a range from 0.01% and 400%; and wherein a mixture of MEPBr and the zinc bromide is heterogeneous.

18. The electrochemical cell of claim 1, wherein the electrochemical cell is gasketed, framed and packaged so as to hold the aqueous electrolyte solution from leaking; and wherein a portion of the anode current collector and a portion of the cathode current collector are exposed for external electrical connections.

19. The electrochemical cell of claim 18, wherein a first copper wire is welded to the exposed portion of the anode current collector; and wherein a second copper wire is welded to the exposed portion of the cathode current collector.

20. The electrochemical cell of claim 18, wherein the electrochemical cell is packaged inside a sealed pouch or case; wherein a first conductive tab and a second conductive tab protruding out of the pouch or case for external electrical connections; wherein the first conductive tab is connected to the anode current collector; and wherein the second conductive tab is connected to the cathode current collector.

21. The electrochemical cell of claim 1, wherein the electrochemical cell is of a rectangular prism shape having a length to width ratio greater than 3; wherein the electrochemical cell is packaged in a sealed cylindrical can; wherein the anode current collector is welded to a first side of the sealed cylindrical can; wherein the cathode current collector is welded to a second side of the sealed cylindrical can; and wherein the first side of the sealed cylindrical can is electrically insulated from the second side of the sealed cylindrical can.

22. The electrochemical cell of claim 1, wherein a sealed single package comprises:
- the electrochemical cell; and
- a plurality of additional electrochemical cells;
- wherein the electrochemical cell and each of the plurality of additional electrochemical cells are in parallel connection;
- wherein the anode current collector is electrically connected to each anode current collector of the plurality of additional electrochemical cells; and
- wherein the cathode current collector is electrically connected to each cathode current collector of the plurality of additional electrochemical cells.

23. The electrochemical cell of claim 1 further comprising:
- a plurality of additional intermediate groups, each of the plurality of additional intermediate groups comprises:
  - an additional cathode insulating mesh;
  - an additional cathode graphite felt;
  - an additional cathode sheet;
  - an additional cathode current collector;
  - a first separator;
  - an additional anode current collector;
  - an additional anode sheet;
  - an additional anode insulating net; and
  - a second separator;
- wherein the plurality of additional intermediate groups are between the insulating porous separator and the cathode-side subassembly; and
- wherein each of the plurality of additional intermediate groups is in series connection.

* * * * *